March 10, 1953 C. C. HUMBERT ET AL 2,630,719
TRANSMISSION MECHANISM HAVING SELECTIVELY
DRIVEN OUTPUT SHAFTS
Filed May 3, 1951 2 SHEETS—SHEET 2

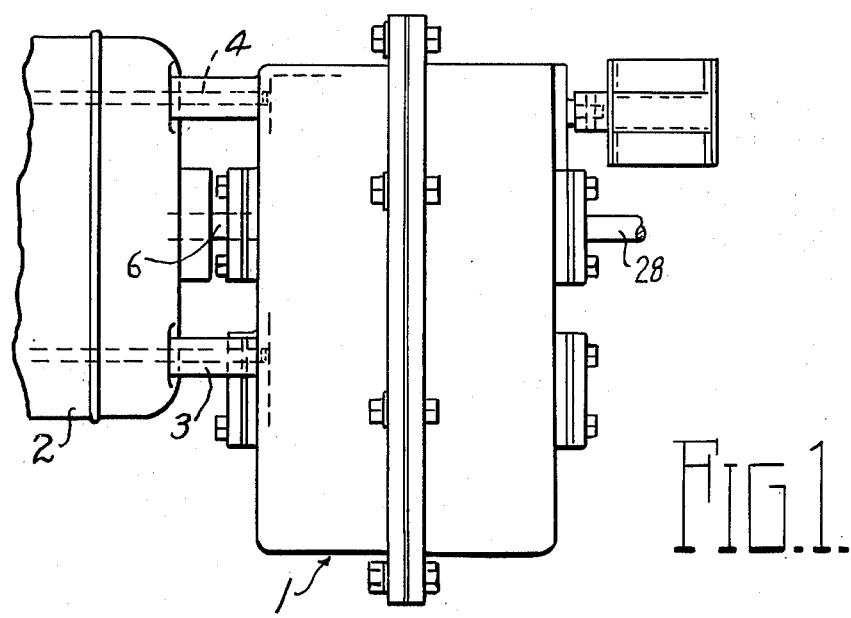
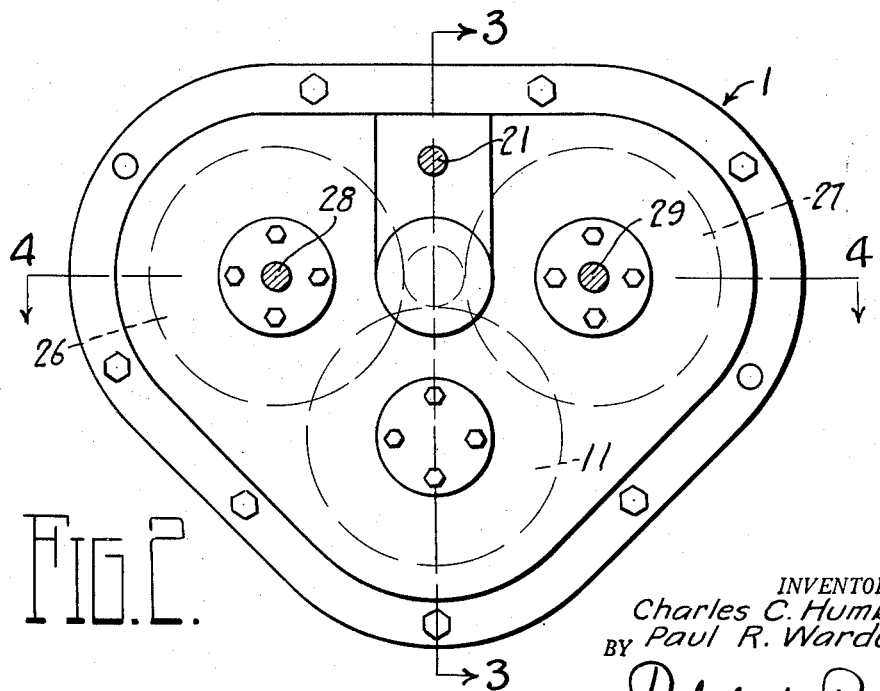

INVENTORS
Charles C. Humbert
BY Paul R. Wardell

ATTORNEY

Patented Mar. 10, 1953

2,630,719

UNITED STATES PATENT OFFICE 2,630,719

TRANSMISSION MECHANISM HAVING SELECTIVELY DRIVEN OUTPUT SHAFTS

Charles C. Humbert and Paul Richard Wardell, Toledo, Ohio

Application May 3, 1951, Serial No. 224,296

2 Claims. (Cl. 74—665)

This invention relates to transmission mechanisms but particularly to a mechanism of this character having a single input shaft and a plurality of output shafts.

An object is to produce a new and improved transmission mechanism unit equipped with a single input shaft and a pair of output shafts and a control device enabling one or the other of the output shafts to be selectively driven.

Another object is to produce a transmission mechanism of the above character having the novel features of construction, arrangement and operation hereinafter described, and for purposes of illustration but not of limitation, an embodiment of the invention is shown on the accompanying drawings, in which Figure 1 is a side elevation of the transmission mechanism unit which is shown operatively connected to an electric motor, a fragment of which is disclosed;

Figure 2 is an end elevation of the transmission mechanism unit, certain of the gears being shown by broken lines;

Figure 3:
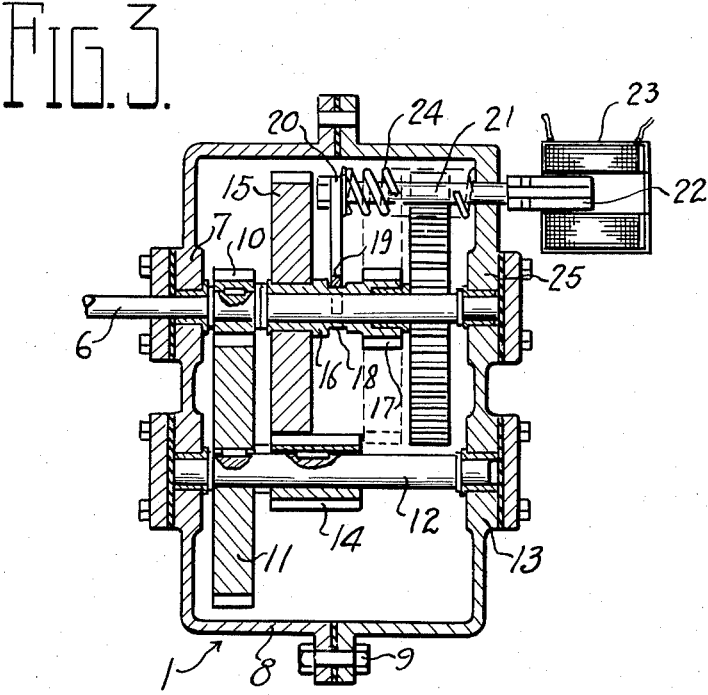
Figure 3 is a vertical sectional elevation taken substantially on the line 3—3 of Figure 2.
Figure 4:
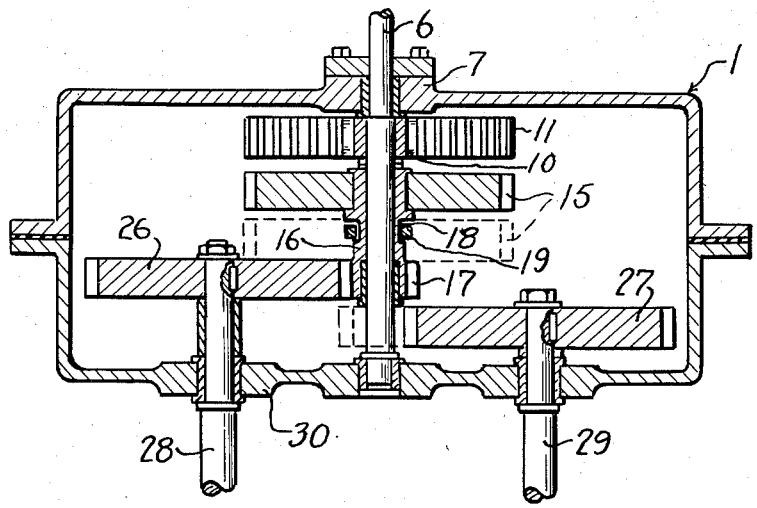
Figure 4 is a transverse sectional view substantially on the line 4—4 of Figure 2.

The illustrated embodiment of the invention comprises a transmission mechanism unit indicated generally at 1, which is connected to be driven by an electric motor 2. In this instance, the motor is spaced from the transmission 1 by a series of sleeves 3 through which extend stud bolts 4, the ends of which may be screwed into tapped holes in the housing of the transmission unit. In this instance, the motor armature shaft 6 constitutes the input shaft for the transmission mechanism and as shown, it extends through a boss 7 in the transmission housing, a suitable bushing being provided as a bearing for same. The unit 1 has a housing made up of a pair of flanged sections 8 which are held together by a series of bolt and nut assemblies 9 extending through the flanges. This provides a closed lubricant-receiving housing which contains the mechanism hereinafter described.

Keyed to the input shaft 6 adjacent the boss 7 is a pinion 10 which is at all times in mesh with a large gear 11 keyed to a countershaft 12, the ends of which rotate in bearing sleeves carried by bosses 13 formed in the end walls of the housing sections. Also keyed to the countershaft 12 adjacent the gear 11 is an elongate pinion 14 which is at all times in mesh with a relatively large gear 15, the diameter of which is of the same size as the gear 11. The gear 15 is rigid with an elongate sleeve 16 which is mounted upon the input shaft 6 but is free to rotate relatively thereto as well as to shift axially thereon. Integral with the opposite end of the sleeve 16 is a pinion 17 and between the pinion 17 and gear 15 is an annular groove 18 which is straddled by a yoke 19 carried by an arm 20 which extends perpendicular to the axis of the sleeve 16. Connected to the upper end of the arm 20 and extending at right angles thereto is a rod 21 which extends through an aperture in an end wall of the housing and carries a solenoid armature 22 at its outer end which is movable within the solenoid 23.

Encircling the rod 21 is a helically coiled spring 24, one end of which bears against the arm 20 and the opposite end against the inner wall of the housing. Thus it will be apparent that normally the spring 24 holds the gear 15 and pinion 17 in the left-hand position shown by full lines on Figure 3. Upon energizing the solenoid 23, the gear 15 and pinion 17 are shifted to the right but in either of the positions, the gear 15 remains in mesh with the pinion 14, the latter being sufficiently elongate to afford the desired lateral shifting movement without becoming disengaged. It will be noted that the free end portion of the input shaft 6 bears in the sleeve carried by a boss 25 oppositely arranged to the boss 7 so that the shaft 6 is supported in opposite end walls of the housing.

The axially shiftable pinion 17 is adapted to mesh either with the gear 26 or a gear 27 keyed respectively to output shafts 28 and 29 arranged in parallel relation on opposite sides of the input shaft 6 and supported by bearings carried by bosses 30 formed in the adjacent end wall of the housing. The gears 26 and 27 are the same diameter as the gears 11 and 15 and these gears are spaced axially from each other, the gear 26 being spaced inwardly within the housing from the gear 27. However, the spacing of the gears is such that the pinion 17 can be shifted to mesh with one or the other. Normally, when the solenoid 23 is deenergized, the pinion meshes with the gear 26. However, upon energizing the solenoid 23, the pinion 17 is shifted into mesh with the gear 27. The arrangement is such that the gears 26 and 27 are driven in the same direction. Manifestly due to the gear reduction, the rotational speed of the gears 26 and 27 will be but a fraction of that of the input shaft 6.

From the above description, it will be apparent that we have produced an exceedingly simple and efficient transmission mechanism by which, from a single input shaft, one or another of the output shafts may be driven selectively at a greatly reduced rotational speed. Although a transmission of this character may be used in a variety of places, it can be advantageously used for the operation of a hospital bed for selectively raising and/or lowering the foot and head end sections of the bed. The reverse operation can be simply achieved by employing a reversible electric motor.

It is to be understood that numerous changes in details of construction, arrangement and operation may be effected without departing from the spirit of the invention especially as defined in the appended claims.

What we claim is:

1. Transmission comprising a drive shaft, a pinion fixed to said drive shaft, a countershaft spaced laterally from and in parallel relation to said drive shaft, a relatively large gear fixed to said countershaft and meshing with said pinion, a relatively long pinion fixed to said countershaft, a relatively large driven gear free to rotate and slide axially on said drive shaft, a pinion coaxial and rigid with said driven gear and similarly rotatable and slidable freely on said drive shaft, said driven gear meshing at all times with said relatively long pinion but being shiftable parallely thereto, a pair of output shafts arranged respectively on opposite sides of said drive shaft, gears of substantially the same size on said output shafts respectively, one of said last gears being laterally spaced relatively to the other, and means for axially shifting the driven gear and its pinion for meshing the latter with one or the other of the gears on said output shafts, said last means including spring-tensioned means normally retaining the axially shiftable pinion in mesh with one of said last gears.

2. Transmission comprising a drive shaft, a pinion fixed to said drive shaft, a countershaft spaced laterally from and in parallel relation to said drive shaft, a relatively large gear fixed to said countershaft and meshing with said pinion, a relatively long pinion fixed to said countershaft, a relatively large driven gear free to rotate and slide axially on said drive shaft, a pinion coaxial and rigid with said driven gear and similarly rotatable and slidable freely on said drive shaft, said driven gear meshing at all times with said relatively long pinion but being shiftable parallely thereto, a pair of output shafts arranged respectively on opposite sides of said drive shaft, gears of substantially the same size on said output shafts respectively, one of said last gears being laterally spaced relatively to the other, spring means for normally retaining the axially shiftable pinion in engagement with one of said last gears, and electromagnetic means for shifting such pinion into mesh with the other of said last gears.

CHARLES C. HUMBERT.
PAUL RICHARD WARDELL.

REFERENCES CITED

The following references are of record in the file of this patent:

UNITED STATES PATENTS

| Number | Name | Date |
|---|---|---|
| 1,225,202 | Ahle et al. | May 8, 1917 |
| 2,189,548 | Gent | Feb. 6, 1940 |
| 2,190,924 | Joy | Feb. 20, 1940 |
| 2,354,204 | Gentry | July 25, 1944 |
| 2,543,564 | Bakewell | Feb. 27, 1951 |
| 2,555,448 | Koob | June 5, 1951 |